US012311399B2

(12) United States Patent
Eboigbodin et al.

(10) Patent No.: US 12,311,399 B2
(45) Date of Patent: May 27, 2025

(54) BEVERAGE DISPENSING NOZZLE

(71) Applicant: PepsiCo, Inc., Purchase, NY (US)

(72) Inventors: Evans Eboigbodin, White Plains, NY (US); Steven T. Jersey, Laguna Niguel, CA (US); Fernando A. Ubidia, Ludlow, MA (US); Aaron Stein, Middletown, CT (US); Jose-Luis Arroyo, Springfield, MA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 18/310,947

(22) Filed: May 2, 2023

(65) Prior Publication Data

US 2023/0264211 A1 Aug. 24, 2023

Related U.S. Application Data

(62) Division of application No. 16/792,016, filed on Feb. 14, 2020, now Pat. No. 11,679,397.

(51) Int. Cl.

| | |
|---|---|
| ***B05B 7/04*** | (2006.01) |
| ***B01F 25/00*** | (2022.01) |
| *B01F 101/14* | (2022.01) |

(52) U.S. Cl.

CPC ............ *B05B 7/0408* (2013.01); *B01F 25/00* (2022.01); *B01F 2101/14* (2022.01)

(58) Field of Classification Search

CPC ..... B05B 7/0408; B01F 25/00; B01F 2101/01
USPC ............................ 239/432; 222/145.5, 145.6
See application file for complete search history.

(56) References Cited

U.S. PATENT DOCUMENTS

| | | | |
|---|---|---|---|
| 2,469,327 | A | 5/1949 | Copping |
| 2,620,108 | A | 12/1952 | Copping |
| 5,048,726 | A | 9/1991 | McCann et al. |
| 6,253,963 | B1 | 7/2001 | Tachibana |
| 6,871,761 | B2 | 3/2005 | Fox |
| 8,651,333 | B2 | 2/2014 | Metropulos et al. |
| 9,409,756 | B2 | 8/2016 | Piatnik et al. |

(Continued)

FOREIGN PATENT DOCUMENTS

| | | |
|---|---|---|
| JP | S47-020894 U | 11/1972 |

OTHER PUBLICATIONS

International Search Report and Written Opinion of the International Searching Authority in International Application No. PCT/US2021/016725, mailed Apr. 12, 2021 (10 pages).

(Continued)

*Primary Examiner* — Christopher S Kim
(74) *Attorney, Agent, or Firm* — Sterne, Kessler, Goldstein & Fox P.L.L.C.

(57) ABSTRACT

A nozzle for dispensing a beverage includes a nozzle head having a base liquid inlet configured to receive a base liquid and a flavoring inlet configured to receive a flavoring. The nozzle further includes a diffuser assembly that is in fluid communication with the base liquid inlet and which includes a diffuser plate having a plurality of peripheral openings through which the base liquid flows. The nozzle further includes a receptacle that is in fluid communication with the diffuser assembly and the flavoring inlet. The receptacle of the nozzle includes an inner wall, and the peripheral openings of the diffuser assembly are arranged so as to direct flow of the base liquid along the inner wall of the receptacle. The receptacle further includes an outlet through which the flavoring and the base liquid are dispensed.

12 Claims, 15 Drawing Sheets

(56) References Cited

U.S. PATENT DOCUMENTS

| | | | |
|---|---|---|---|
| 2007/0151992 | A1 | 7/2007 | Carlson et al. |
| 2018/0237280 | A1 | 8/2018 | Alberini et al. |
| 2018/0282143 | A1 | 10/2018 | Chang et al. |

OTHER PUBLICATIONS

Extended European Search Report in counterpart European Appl. No. 21752946.0, mailed Jan. 29, 2024 (10 pages).

BEVERAGE DISPENSING NOZZLE

CROSS-REFERENCE TO RELATED APPLICATIONS

This application is a divisional of U.S. application Ser. No. 16/792,016, filed on Feb. 14, 2020, which is incorporated herein by reference in its entirety.

FIELD

Embodiments described herein generally relate to beverage dispensing nozzles. Specifically, embodiments described herein relate to multi-flavor beverage dispensing nozzles configured to dispense a base liquid and a flavoring in a smooth, laminar flow pattern.

BACKGROUND

Nozzles are often used to dispense beverages for consumption, such as in a fountain beverage dispenser. Nozzles can be categorized as pre-mix nozzles, in which a beverage is dispensed through the nozzle, and post-mix nozzles in which carbonated water or other base liquid and a beverage flavoring, such as a syrup, are dispensed separately from the nozzle and are combined at the point of dispense, either within the nozzle or outside of the nozzle. The water and flavoring may mix while traveling to a beverage container or within the beverage container as the container is being filled.

Post-mix nozzles provide the advantage of allowing for a variety of beverages to be dispensed from a single nozzle. The post-mix nozzle may be in communication with various sources of flavoring such that the post-mix nozzle can be used to dispense a variety of beverages by dispensing the base liquid along with a desired flavoring. In this way, multiple types of beverages can be dispensed without requiring a premixed reservoir of each beverage.

BRIEF SUMMARY OF THE INVENTION

Some embodiments described herein relate to a nozzle for dispensing a beverage, that includes a nozzle head having a base liquid inlet configured to receive a base liquid from a base liquid source, and a flavoring inlet configured to receive a flavoring from a flavoring source. The nozzle may further include a diffuser assembly in fluid communication with the base liquid inlet, wherein the diffuser assembly includes at least one diffuser plate having an annular region with a plurality of peripheral openings through which the base liquid flows. The nozzle may further include a receptacle in fluid communication with the diffuser assembly and the flavoring inlet, wherein the receptacle includes an inner wall, and an outlet through which the base liquid and the flavoring are dispensed, wherein the peripheral openings of the diffuser assembly are arranged so as to direct a flow of the base liquid along the inner wall of the receptacle, and wherein the flavoring inlet directs a flow of the flavoring through the receptacle in a longitudinal direction of the nozzle.

In any of the various embodiments discussed herein, the flavoring inlet may be one of a plurality of flavoring inlets, and the base liquid inlet may be one of a plurality of base liquid inlets. In some embodiments, the nozzle head may include a central section and a peripheral section that surrounds the central section, and the plurality of flavoring inlets may be arranged in the central section and the plurality of base liquid inlets may be arranged in the peripheral section.

In any of the various embodiments discussed herein, the diffuser assembly may include a first diffuser plate and a second diffuser plate arranged in a stacked configuration.

In any of the various embodiments discussed herein, the diffuser assembly may include a central opening in which a base of the nozzle head is arranged.

In any of the various embodiments discussed herein, an inner edge of a peripheral opening of the plurality of peripheral openings may be aligned with the inner wall of the receptacle.

In any of the various embodiments discussed herein, the receptacle may include an upper end and a lower end, wherein the nozzle head and the diffuser assembly may be arranged at the upper end of the receptacle, and the outlet may be disposed at the lower end of the receptacle. In some embodiments, the receptacle may taper from the upper end toward the lower end.

In any of the various embodiments discussed herein, the inner wall of the receptacle may have a curvature.

In any of the various embodiments discussed herein, the flavoring and the base liquid may intersect within the receptacle. In some embodiments, the flavoring may intersect with the base liquid at the outlet of the receptacle.

In any of the various embodiments discussed herein, the outflow stabilizer may be arranged within the outlet of the receptacle, and the outflow stabilizer may be configured to direct the flow of the base liquid and the flavoring through the outlet along a longitudinal axis of the nozzle.

In any of the various embodiments discussed herein, the beverage dispensing nozzle may further include one or more vent holes arranged on an upper end of the receptacle configured to equalize a pressure within the receptacle with an external pressure.

Some embodiments described herein relate to a nozzle having a nozzle head that includes a central section, a peripheral section surrounding the central section, a flavoring inlet arranged in the central section and configured to receive a flavoring, and a base liquid inlet arranged in the peripheral section and configured to receive a base liquid. The nozzle may further include a receptacle that includes an upper end, a lower end, and an outlet arranged at the lower end of the receptacle through which the base liquid and the flavoring are dispensed from the nozzle. The nozzle may further include a diffuser assembly in fluid communication with the base liquid inlet and the receptacle, wherein the diffuser assembly includes at least one diffuser plate comprising an annular region defining a plurality of peripheral openings through which the base liquid flows into the receptacle. The flavoring inlet may be in fluid communication with the receptacle so as to provide a flow of the flavoring through the receptacle in a longitudinal direction of the nozzle such that the flow of the flavoring and the flow of the base liquid intersect within the receptacle and are dispensed together through the outlet.

In any of the various embodiments discussed herein, the plurality of peripheral openings may be arranged adjacent to an inner wall of the receptacle such that the diffuser assembly directs the flow of the base liquid along the inner wall of the receptacle.

In any of the various embodiments discussed herein, the flavoring inlet may be arranged at a central section of the nozzle head such that the flow of the flavoring intersects the flow of the base liquid at the outlet of the receptacle.

Some embodiments described herein relate to a nozzle having a nozzle head that includes a flavoring inlet port for receiving a flavoring and a base liquid inlet for receiving a base liquid. The nozzle may further include a diffuser assembly that includes at least one diffuser plate having an annular region defining a plurality of peripheral openings through which the base liquid flows. The nozzle may further include a receptacle having an inner wall having a curvature, an outlet for dispensing the base liquid and the flavoring from the nozzle, and a vent tube configured to equalize a pressure within the receptacle with a pressure external to the beverage dispensing nozzle. The flavoring inlet of the nozzle head of the nozzle may be in fluid communication with the receptacle such that the flavoring flows through the receptacle toward the outlet in a longitudinal direction of the nozzle, and wherein the diffuser assembly may be in fluid communication with the receptacle such that the base liquid flows along the inner wall of the receptacle.

In any of the various embodiments discussed herein, the nozzle may further include a plurality of vanes radially arranged on the inner wall of the receptacle.

In any of the various embodiments discussed herein, the vent tube of the nozzle may include an upper end and a lower end, and wherein the upper end is arranged within the receptacle and comprises an opening on a sidewall of the vent tube, and wherein the lower end is arranged outside of the receptacle and comprises an opening.

In any of the various embodiments discussed herein, the vent tube may be arranged parallel to a longitudinal axis of the nozzle.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
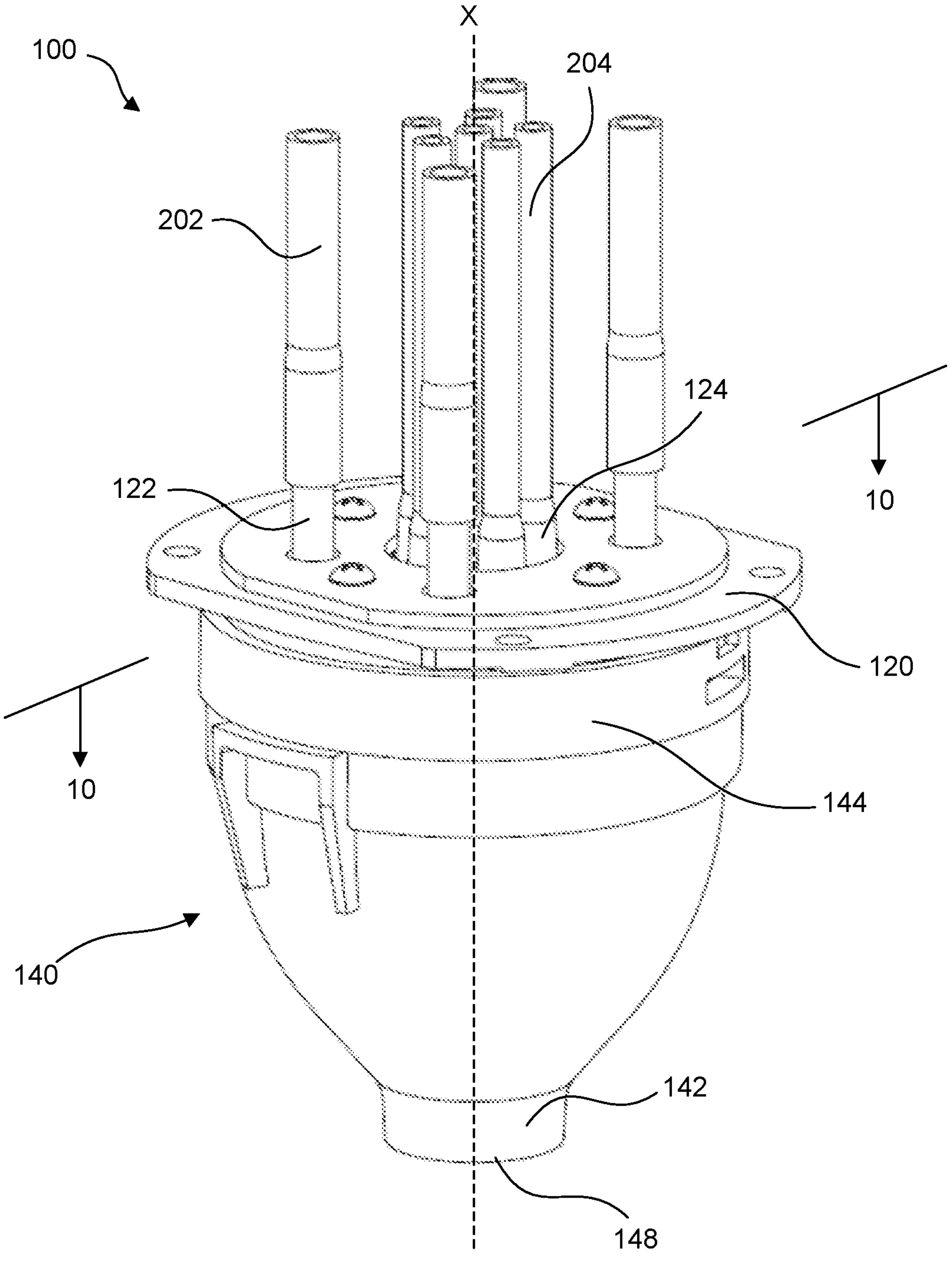
FIG. 1 shows a perspective view of a beverage dispensing nozzle according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Post-mix beverage dispensing nozzles may be used to dispense multiple beverages. Such beverage dispensing nozzles generally provide a flow of a base liquid, and a flow of a syrup or flavoring, and the base liquid and flavoring are mixed at the point of dispense, either within the nozzle or outside of the nozzle to create a beverage. By providing a flow of a base liquid that is separate from the flow of flavoring, a single beverage dispensing nozzle may be used to dispense multiple types of beverages by dispensing the base liquid along with the desired flavoring.

While post-mix nozzles may allow for multiple beverage to be dispensed from a single nozzle, such nozzles may have the drawback of carryover of flavor. For example, if the beverage dispensing nozzle is used to dispense a first beverage, and is subsequently used to dispense a second beverage, flavoring from the first beverage may remain within the nozzle and mix with the second beverage as the second beverage is being dispensed. As a result, the second beverage may be contaminated by the first flavoring and the second beverage may not have the desired taste. Additionally, drops of flavoring remaining within lines or conduits through which the various flavorings are dispensed can be drawn out as the base liquid contacts or flows by the lines or conduits carrying the various flavorings, exacerbating flavor carryover. Thus, there is a need in the art for a multi-flavor beverage dispensing nozzle that reduces or eliminates carryover of flavor.

Further, beverage dispensing nozzles often dispense a beverage with an aerated or turbulent flow pattern. As a result, the dispensed beverage does not flow smoothly and consistently as it is dispensed and may splash or sputter. The dispensed beverage may appear non-uniform and opaque due to aeration of the beverage during mixing of the base liquid and flavoring exiting the nozzle. Achieving a smooth and consistent flow of a beverage dispensed from a nozzle may be particularly challenging for multi-flavor beverage dispensing nozzles due to the different flow paths of the different flavors. Accordingly, there is a need in the art for a beverage dispensing nozzle that provides a smooth and laminar flow pattern to reduce splashing or spraying and to provide an aesthetically pleasing flow of beverage.

Some embodiments described herein relate to a beverage dispensing nozzle that reduces carryover of flavor. The beverage dispensing nozzle ensures that flavoring does not remain within the nozzle after a beverage is dispensed, and further prevent contact of the base liquid and the flavoring inlets. As a result, the beverage dispensing nozzle may dispense various types of beverages without contamination of each beverage by the other flavorings. Some embodiments described herein relate to a beverage dispensing nozzle configured to dispense a beverage with a smooth, laminar flow pattern to provide an aesthetically pleasing appearance and to improve the experience of dispensing a beverage. As a result, the beverage dispensed from the nozzle may resemble water flowing from a pitcher or from a water fountain.

A beverage dispensing nozzle 100 for dispensing a beverage with a smooth and gentle flow is shown in FIG. 1. Beverage dispensing nozzle 100 is configured to dispense a base liquid and a flavoring so as to form a beverage. Beverage dispensing nozzle 100 is configured to dispense a variety of base liquids and a variety of flavorings such that beverage dispensing nozzle 100 may be used to dispense a wide variety of beverages.

As used herein, the term "beverage" refers to a combination of any base liquid and any flavoring. A "base liquid" may be, for example, water, carbonated water, sparkling water, chilled water, or mineral water, among other liquids. A "flavoring" may be any of various additives in liquid form that is used to sweeten, add flavor, or enhance the base liquid, such as syrups, sweeteners, or concentrates, among other additives. For example, a carbonated cola beverage may be created by combining carbonated water as the base liquid with a cola-flavoring or syrup. Alternatively, an iced tea beverage may be created by combining chilled water as the base liquid with a tea flavoring.

Figure 2:
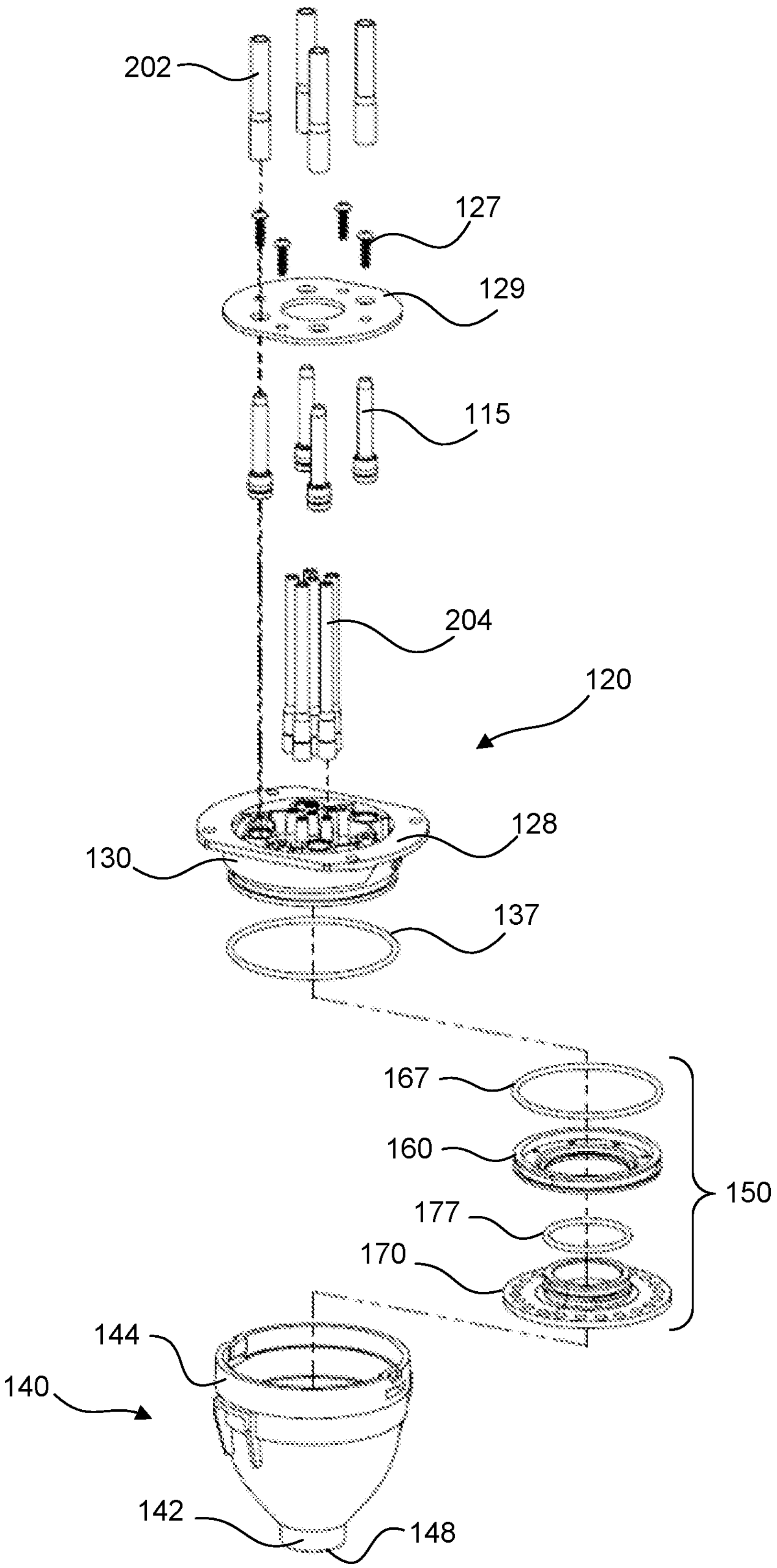
FIG. 2 shows an exploded perspective view of the beverage dispensing nozzle of FIG. 1.

In some embodiments, nozzle 100 includes a nozzle head 120, as shown in FIGS. 1 and 2. Nozzle head 120 may include flavoring inlets 124 for receiving flavorings from a flavoring source, such as a flavoring storage container, e.g., a bag-in-box (BiB). Flavoring inlets 124 may be connected to a flavoring source by a flavoring supply line 204. Nozzle head 120 further includes base liquid inlets 122 for receiving base liquids from a source of base liquid, such as a municipal water supply, a liquid storage receptacle, or the like. Base liquid inlets 122 may be connected to a base liquid source by a base liquid supply line 202. Beverage dispensing nozzle 100 may further include a diffuser assembly 150 in fluid communication with the base liquid inlets 122. Diffuser assembly 150 may include one or more diffuser plates 160, 170 for controlling a flow of base liquid, and distributing base liquid to a receptacle 140 of nozzle 100. Receptacle 140 is configured to receive a flow of the base liquid from the diffuser assembly 150 as well as a flow of the flavoring directly from flavoring inlets 124. Receptacle 140 includes an outlet 148 for dispensing a smooth, laminar flow of the base liquid and the flavoring to provide a beverage for consumption.

Figure 3:
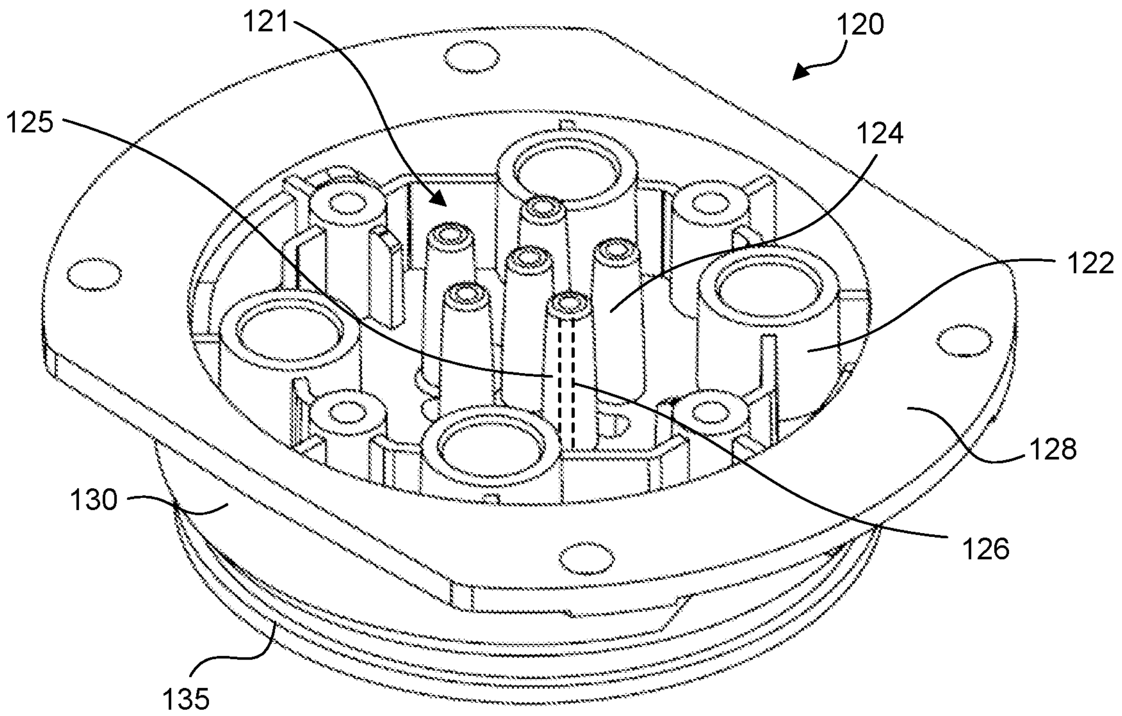
FIG. 3 shows a perspective view of the nozzle head of the beverage dispensing nozzle of FIG. 1.
Figure 4:
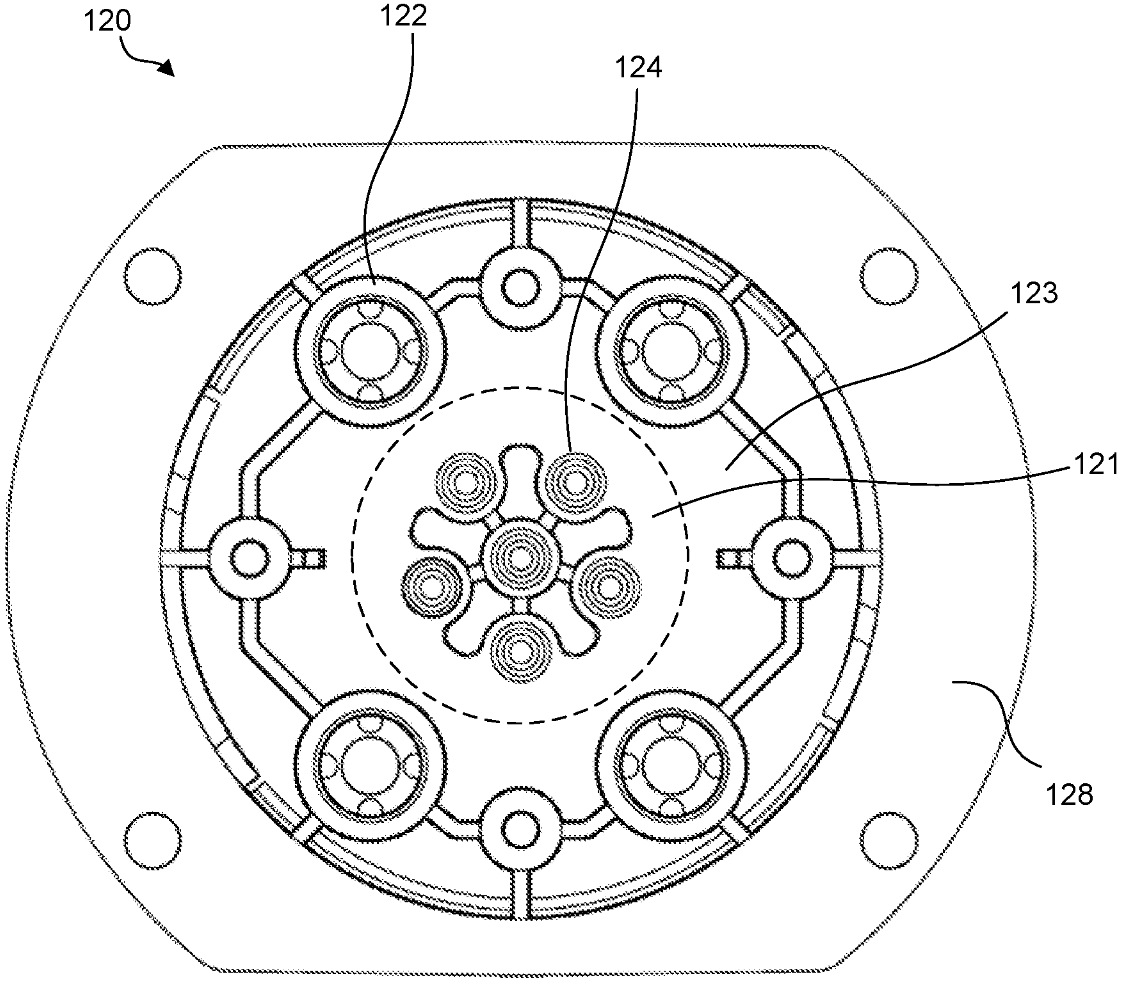
FIG. 4 shows a top down view of the nozzle head of FIG. 3

A nozzle head 120 of nozzle 100 according to an embodiment is shown in FIGS. 3-4. Nozzle head 120 may include base liquid inlets 122 and flavoring inlets 124. Each base liquid inlet 122 may be connected to a base liquid source. In some embodiments, each base liquid inlet 122 may be connected to a different type of base liquid, so that each base liquid inlet 122 provides a different base liquid. For example, a first base liquid inlet 122 may be connected to a source of flat water, and a second base liquid inlet 122 may be connected to a source of carbonated water. It is understood that each base liquid inlet 122 may receive any base liquid. Similarly, each flavoring inlet 124 may be connected to a flavoring source. Each flavoring inlet 124 may be connected to a flavoring source such that nozzle 100 may dispense a variety of different flavorings. For example, a first flavoring inlet 124 may be connected to a source of a cola flavoring, and a second flavoring inlet 124 may be connected to a source of a lemon-lime flavoring. It is understood that any flavoring inlet 124 may receive any flavoring.

In some embodiments, each base liquid inlet 122 and flavoring inlet 124 may include an upstanding tubular wall 125 defining a bore 126 extending through nozzle head 120 to base 130 of nozzle head 120 and terminating at base liquid outlet 132 and flavoring outlet 134, respectively. Base liquids and flavorings flow through bores 126 of each inlet 122, 124 and into nozzle 100. In such embodiments, upstanding tubular wall 125 may be configured to engage with an inner diameter of a supply line or conduit 202, 204 that supplies the flavorings or base liquids to nozzle 100.

In some embodiments, each base liquid inlet 122 or flavoring inlet 124 may receive a fitting 115 configured to facilitate connection of a supply line 202, 204 to the base liquid inlet 122 or flavoring inlet 124, as shown for example in FIG. 2. Fitting 115 may have a hollow tubular shape. In some embodiments, a retention plate 129 may be secured to nozzle head 120 over fittings 115 and secured to nozzle head 120 to hold fittings 115 and/or supply lines 202, 204 in position. Retention plate 129 may be secured to nozzle head 120 via any of various fastening methods, such as via the use of mechanical fasteners 127, including screws or bolts, among other fasteners.

In some embodiments, nozzle head 120 may include a central section 121 and a peripheral section 123 arranged outside of and surrounding central section 121, as best shown in FIG. 4. Flavoring inlets 124 may be arranged at central section 121 of nozzle head 120. In this way, flavoring inlets 124 are centrally arranged on nozzle 100 and are aligned with outlet 148 of nozzle 100 in a longitudinal direction of nozzle 100 (see, e.g., FIG. 10). Flavoring inlets 124 may be arranged with a first flavoring inlet 124 at a center of nozzle head 120 and additional flavoring inlets 124 may be arranged around first flavoring inlet 124, such as in a circular pattern around the first flavoring inlet 124. For example, in FIG. 4, five flavoring inlets 124 are arranged around a first flavoring inlet 124. However, in some embodiments, flavoring inlets 124 may be arranged in a square or rectangular pattern. The flavoring inlets 124 may be arranged in one or more columns or rows, and adjacent columns or rows may be staggered or offset from one another.

Base liquid inlets 122 may be arranged in peripheral section 123 of nozzle head 120. Base liquid inlets 122 may be arranged around flavoring inlets 124. Base liquid inlets 122 may be radially spaced from flavoring inlets 124 and are located closer to an outer perimeter of nozzle head 120 than flavoring inlets 124. As shown in FIG. 4, nozzle head 120 includes four base liquid inlets 122. However, nozzle head 120 may include fewer or additional base liquid inlets 122.

Nozzle head 120 may further include a flange 128 located at a perimeter of nozzle head 120. Flange 128 may extend around an entire perimeter of nozzle head 120. Flange 128 is provided to facilitate securement of nozzle head 120 to a support structure, such as a portion of a beverage dispenser.

Figure 5:
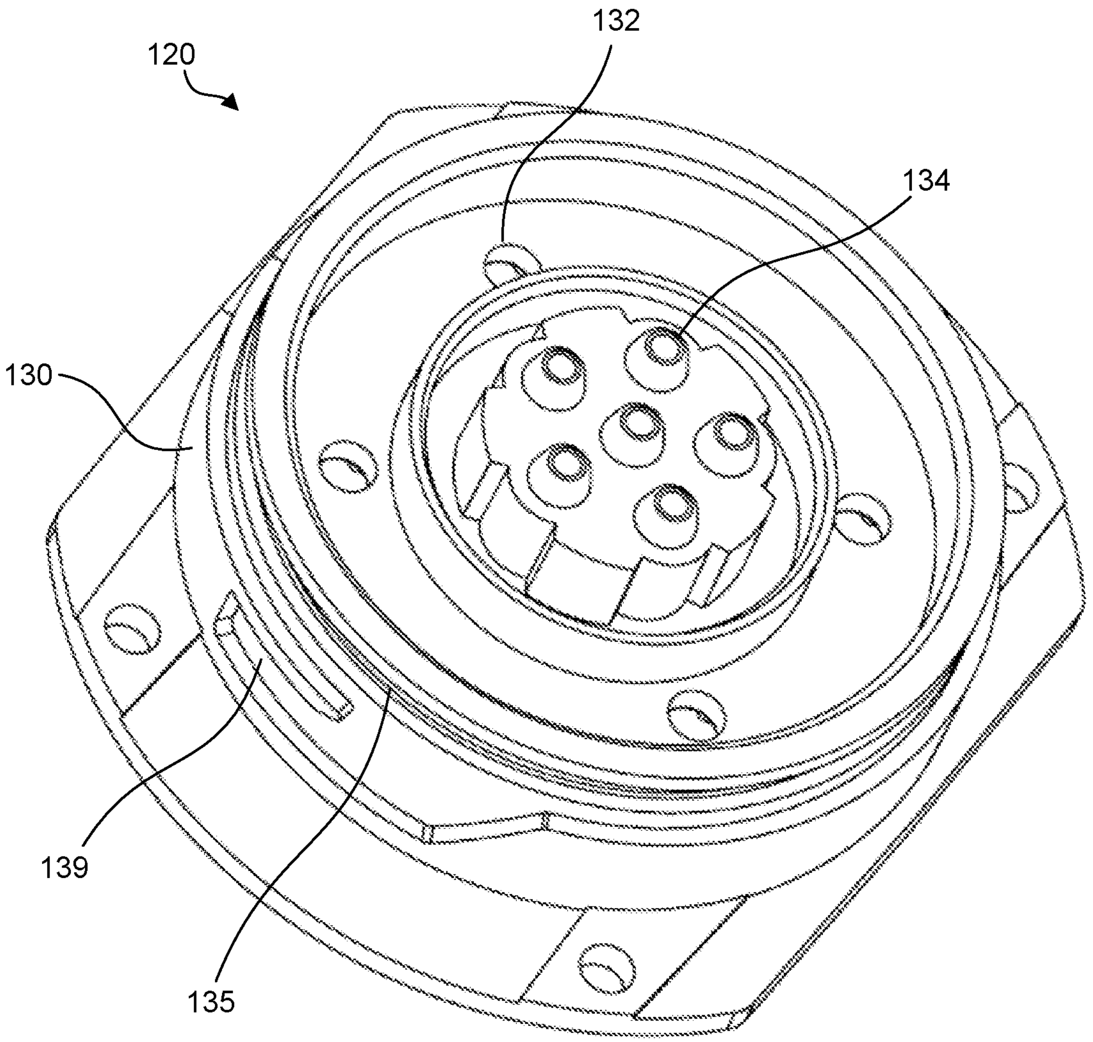
FIG. 5 shows a perspective view of a bottom of the nozzle head of FIG. 3.
Figure 6:
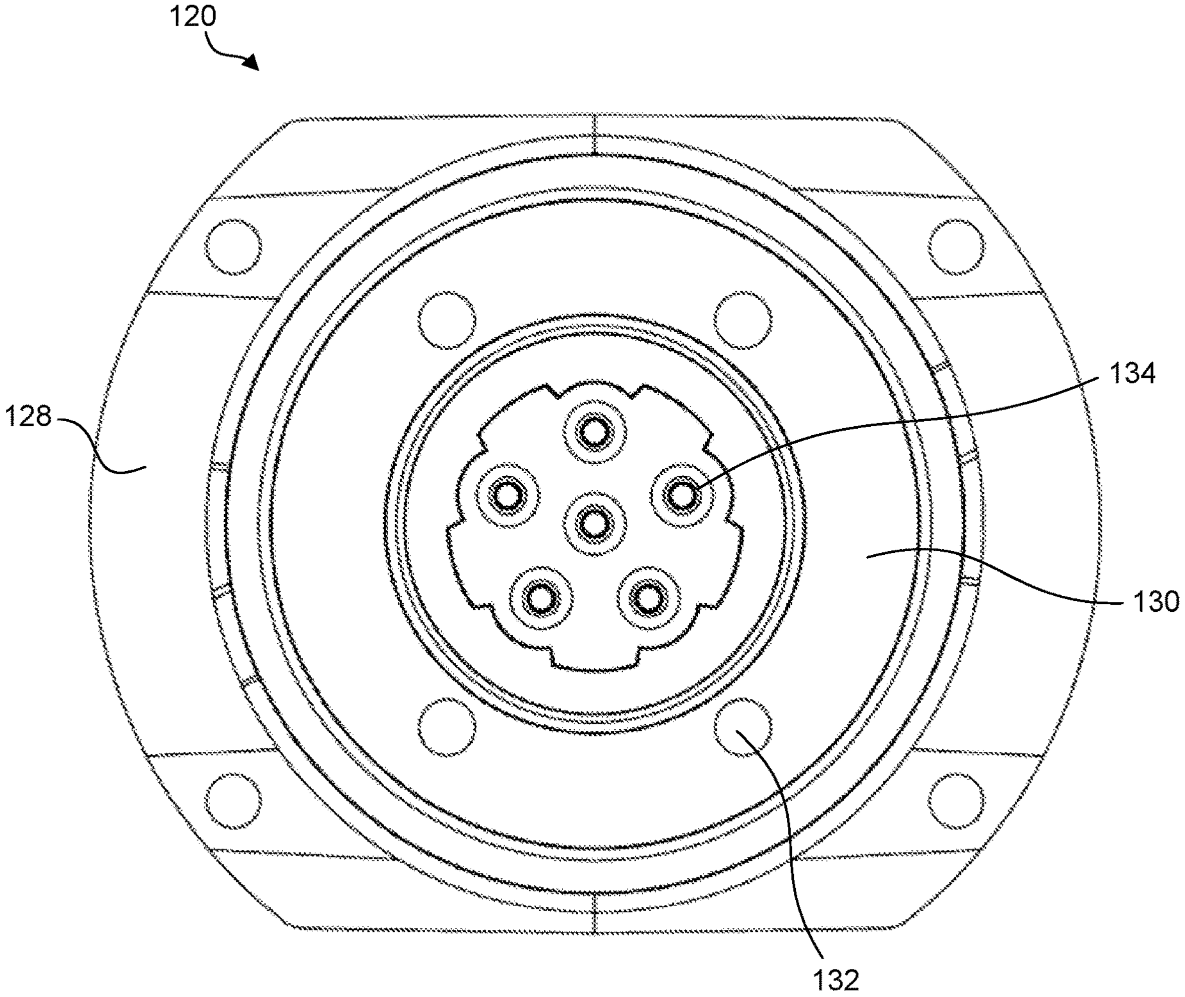
FIG. 6 shows a bottom view of the nozzle head of FIG. 3.

Nozzle head 120 may further include a base 130, as shown in FIGS. 5-6. Flavoring inlets 124 terminate at flavoring outlets 134 on base 130 of nozzle head 120. Flavoring inlets 124 (and the bores thereof) are arranged generally parallel to a longitudinal axis X of nozzle 100 and thus outlets 134 on base 130 of nozzle head 120 are also arranged at a central section of nozzle head 120. Flavoring inlet 124 is in communication with receptacle 140 of nozzle 100 so that flavoring passing through flavoring inlet 124 and out of outlet 134 on base 130 and enters receptacle 140. A flow of flavoring flows through receptacle 140 in a longitudinal direction of nozzle 100. Similarly, base liquid inlets 122 may terminate at base liquid outlets 132 on base 130. However, outlets 132 supply base liquid to diffuser assembly 150 of nozzle 100, as discussed in further detail herein, rather than directly to receptacle 140.

Base 130 of nozzle head 120 may include one or more recesses 139 partially extending around a perimeter of base 130 and a groove 135 extending around a perimeter of base 130. Recess 139 may be configured to secure a receptacle 140 to nozzle head 120 of nozzle 100. Receptacle 140 may include one or more tabs 143 arranged around a perimeter of receptacle 140 that are configured to engage with recess 139 of nozzle head 120. Securement of receptacle 140 to nozzle head 120 may be achieved by placing receptacle 140 over nozzle head 120 and rotating receptacle 140 so that tabs 143 are inserted into recesses 139 of nozzle head 120. Receptacle 140 may be rotated until tabs 143 reach the maximum rotational travel allowed by recesses 139. This mechanical mating secures receptacle 140 position longitudinally along an axis X of nozzle 100 and established the rotational orientation of receptacle 140 about the axis X of nozzle with respect to nozzle head 120. Groove 135 may be configured to receive a seal ring 137. Seal ring 137 may be secured to base 130 to form a seal with receptacle 140 when base 130 of nozzle head 120 is received within upper end 144 of receptacle 140 (see, e.g., FIG. 10). Seal ring 137 may help to prevent liquid from escaping from receptacle 140 or from entering receptacle 140 from an exterior of nozzle 100.

Nozzle head 120 may be arranged at upper end 144 of receptacle 140 of nozzle 100 and encloses upper end 144 of receptacle 140. Base liquid inlets 122 of nozzle head 120 are in fluid communication with diffuser assembly 150 so that base liquid supplied to base liquid inlets 122 from fluid source flows through diffuser assembly 150 and into receptacle 140 (see, e.g., base liquid flow B in FIG. 10). Base 130 of nozzle head 120 may extend through central opening 151 of diffuser assembly 150 so that flavoring inlets 124 are in fluid communication with receptacle 140.

Figure 7:
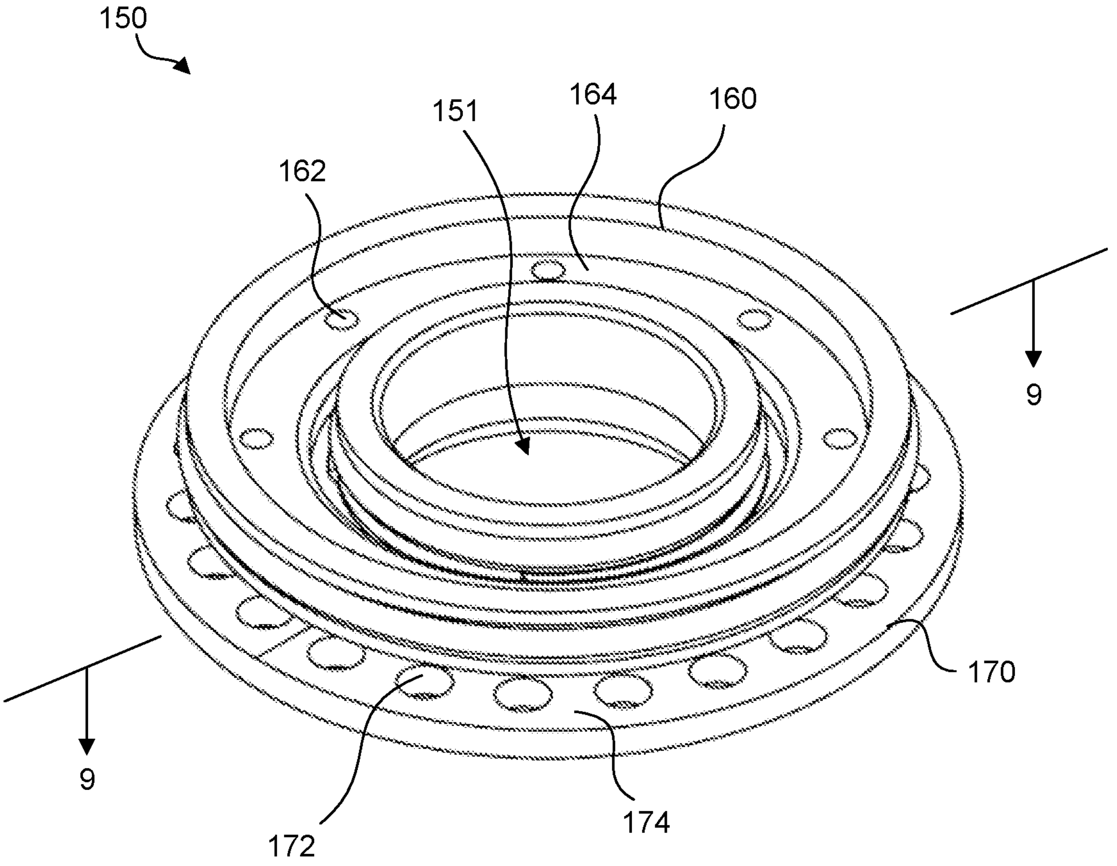
FIG. 7 shows a diffuser assembly of the beverage dispensing nozzle of FIG. 1.
Figure 8:
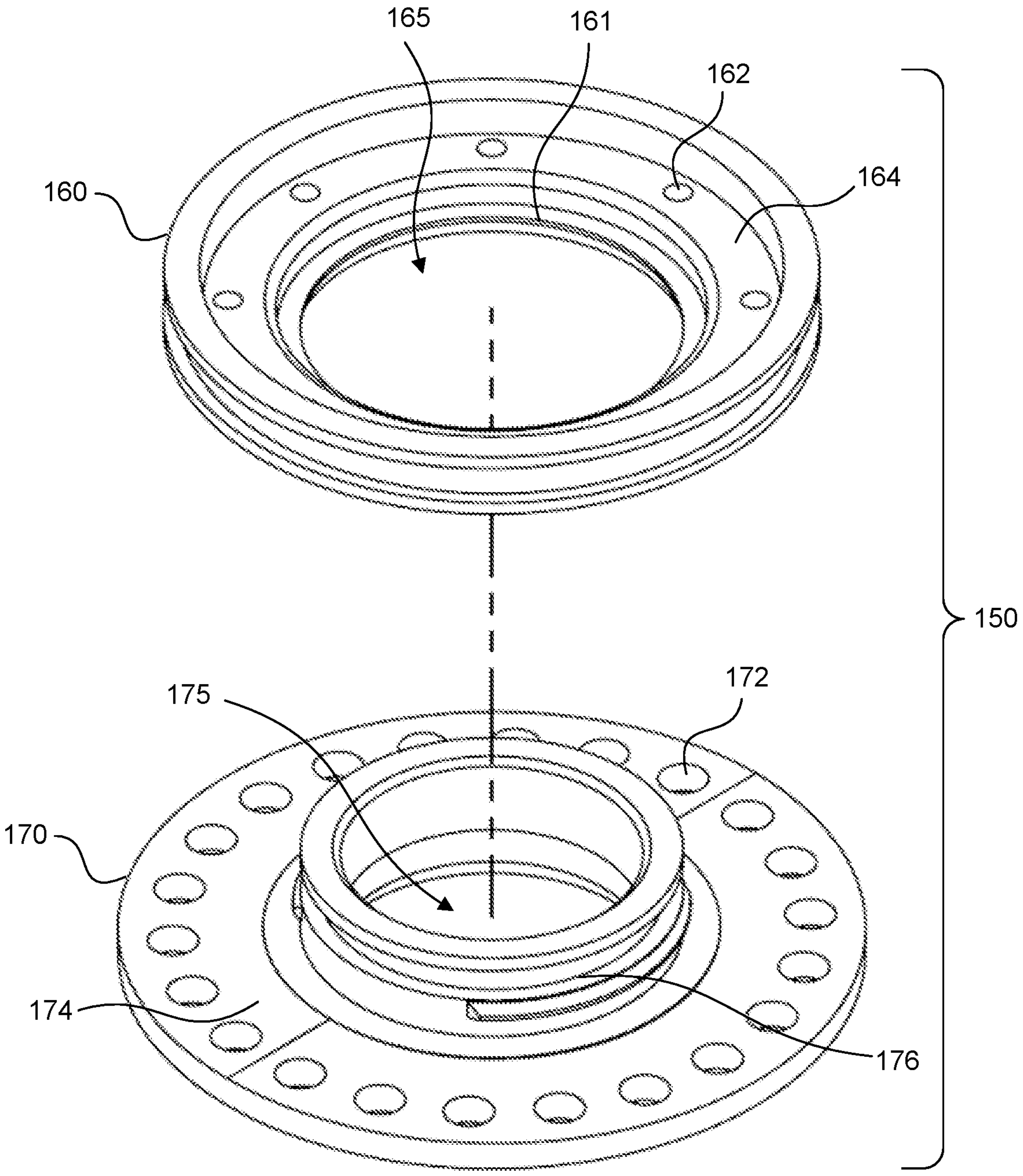
FIG. 8 shows an exploded view of the diffuser assembly of FIG. 7.
Figure 9:
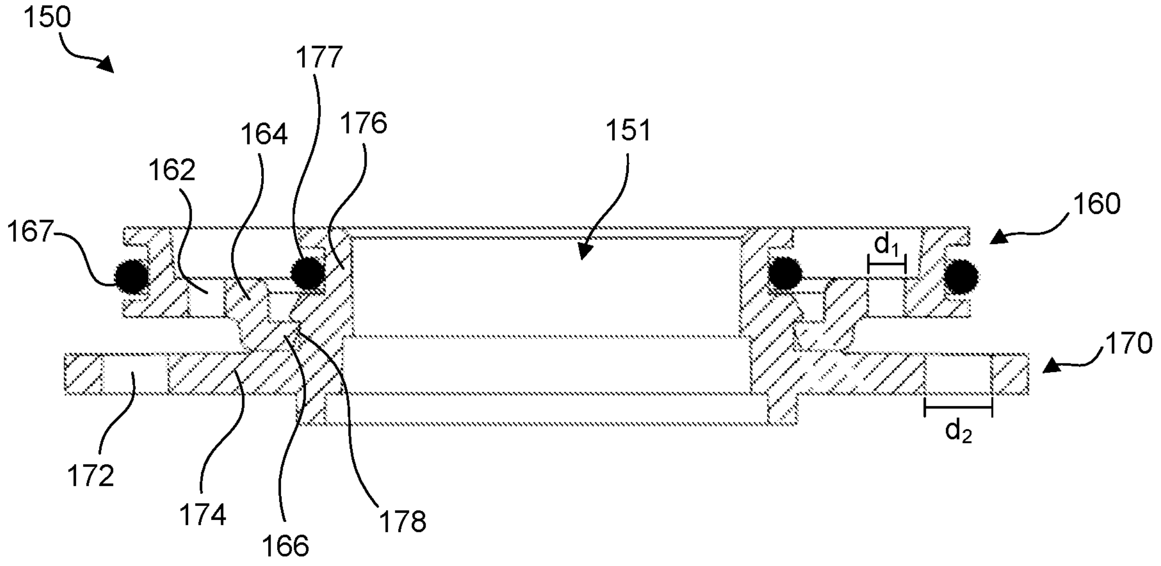
FIG. 9 shows a longitudinal cross sectional view of the diffuser assembly of FIG. 7 as taken along line 9-9 of FIG. 7.

In some embodiments, nozzle 100 includes a diffuser assembly 150, as shown in FIGS. 7-9. Diffuser assembly 150 and receptacle 140 are in fluid communication so that a base liquid may flow through diffuser assembly 150 and into receptacle 140. Diffuser assembly 150 may be arranged below a portion of nozzle head 120 and at an upper end 144 of receptacle 140. Diffuser assembly 150 is configured to provide a smooth and laminar flow of the base liquid into receptacle 140. Diffuser assembly 150 may include a first diffuser plate 160 and a second diffuser plate 170 arranged in a stacked configuration. First diffuser plate 160 is shown as being arranged on top of second diffuser plate 170, however, in some embodiments, second diffuser plate 170 may instead be arranged on top of first diffuser plate 160. In some embodiments, diffuser assembly 150 may include a single diffuser plate or three or more diffuser plates.

First diffuser plate 160, as shown in FIG. 8, includes an annular region 164 defining a central opening 165. Annular region 164 further defines a plurality of peripheral openings 162 arranged around a perimeter of first diffuser plate 160. In the illustrated embodiment, peripheral openings 162 are each the same size in shape. However, in some embodiments, peripheral openings 162 may differ in size or shape. Further, peripheral openings 162 are shown as having a circular shape. However, in some embodiments, peripheral openings 162 may have a square, rectangular, triangular, or oval shape, among others.

In operation, base liquid flows through base liquid inlet 122 and onto annular region 164 of first diffuser plate 160 of diffuser assembly 150. Base liquid is distributed around annular region 164 of first diffuser plate 160 and flows through peripheral openings 162 into receptacle 140 or onto a further diffuser plate (e.g., second diffuser plate 170), depending on the number of diffuser plates in diffuser assembly 150.

In embodiments having a second diffuser plate 170, second diffuser plate 170 may similarly include an annular region 174 defining a central opening 175 and further defining a plurality of peripheral openings 172 arranged around a perimeter of second diffuser plate 170. In some embodiments, second diffuser plate 170 may include an upstanding flange 176 adjacent to central opening 175. Flange 176 may be substantially perpendicular to annular region 174. Flange 176 may be configured to engage with an inner edge 161 of first diffuser plate 160 adjacent central opening 165 so as to secure first diffuser plate 160 to second diffuser plate 170.

In some embodiments, first diffuser plate 160 may be secured to second diffuser plate 170 by a snap-fit connection. As shown in FIG. 9, flange 176 of second diffuser plate 170 may define a recess 178 to receive a protrusion 166 of first diffuser plate 160 so as to secure first and second diffuser plates 160, 170 to one another. However, in some embodiments, first and second diffuser plates 160, 170 may be secured via press-fit, friction fit, interference fit, or the like. Further, in some embodiments, flange 176 of second diffuser plate 170 may include threading so as to engage with threading on an inner edge 161 of first diffuser plate 160. In some embodiments, flange 176 of second diffuser plate 170 may receive and support a seal ring 177 to create a seal with an inner wall 119 surrounding and separating central section 121 from peripheral section 123 of nozzle head 120 (see FIG. 4). A seal ring 167 may be arranged around a perimeter of first diffuser plate 160 in order to provide a seal with diffuser assembly 150 and the peripheral section 123 of nozzle head 120. Both seal ring 177 and seal ring 167 may help to ensure base liquid flows only through peripheral openings 162. Seal ring 167 may help to ensure that no base liquid flows through central opening 151 and may help to ensure that no base liquid flows onto the flavoring outlets 134. Flow of base liquid over flavoring outlets 134 may result in carryover of flavor, which is undesirable.

In some embodiments, first diffuser plate 160 may include a first number $n_1$ of peripheral openings 162 of a diameter $d_1$ and second diffuser plate 170 may include a second number $n_2$ of peripheral openings 172 of a diameter $d_2$. In some embodiments, the second number of peripheral openings is greater than the first number of peripheral openings ($n_2>n_1$). In some embodiments, the diameter of peripheral openings 162 may be smaller than a diameter of peripheral openings 172 ($d_1<d_2$) First diffuser plate 160 having a relatively small number of peripheral openings 162 may help to restrict the locally concentrated flow of base liquid flowing from one or more of the base liquid outlets 132 into diffuser assembly 150 causing the base liquid to fully fill the volume defined by annular region 164, and second diffuser plate 170 having a relatively large number of peripheral openings 172 may help to evenly distribute the base liquid within the volume defined by annular region 174 so that the flow of base liquid is uniformly distributed peripherally as the base liquid flows into receptacle 140. A pressure drop across second diffuser plate 170 may be lower than a pressure drop across first diffuser plate 160. As will be appreciated by one skilled in the art, the number and size as well as the spacing and location of peripheral openings 162 and 172 on first diffuser plate 160 and second diffuser plate 170, and the location at which the flow of the base liquid is directed into receptacle 140 may be specified to suit the nozzle size and the desired nozzle flow rate for a particular beverage dispensing nozzle application.

In some embodiments, diffuser assembly 150 may be configured to provide a flow rate of approximately 2 ounces per second or 1 gallon per minute. This flow rate may provide a smooth, laminar flow within receptacle 140 of nozzle 100, and helps to prevent turbulent flow and splashing within receptacle 140 of nozzle 100. Turbulent flow and splashing may result in carryover of flavor and may cause turbulent flow of beverage through outlet 148 of nozzle 100. As will be appreciated by one skilled in the art, the flow rate may be increased above 2 ounces per second if a diameter of an outlet 148 of nozzle 100 is also increased. Increasing a flow rate without increasing diameter of outlet 148 could result in base liquid backing up within receptacle 140, which may also result in turbulent flow and base liquid entering dry zone 149, which is undesirable.

Figure 10:
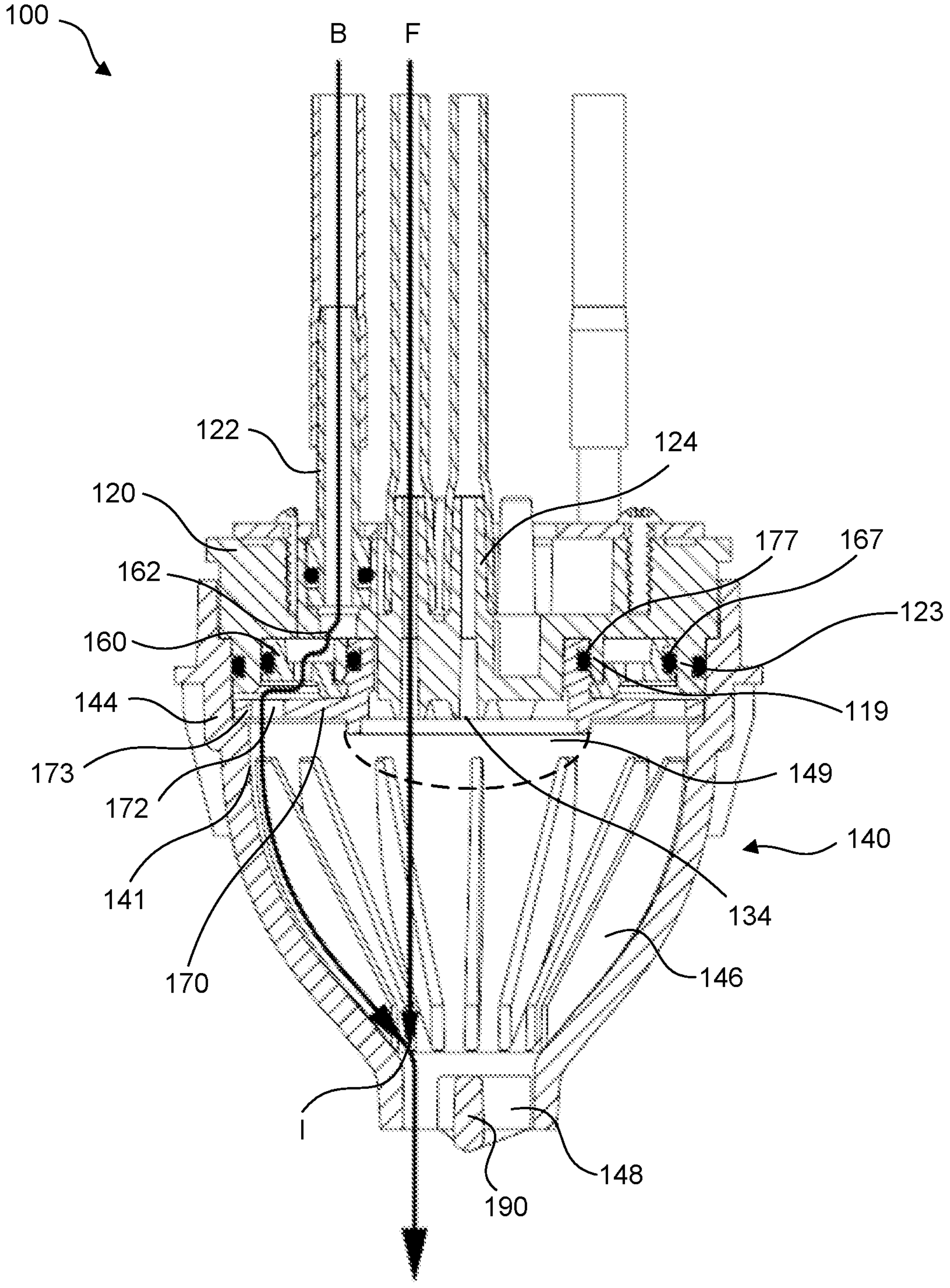
FIG. 10 shows a longitudinal cross sectional view of the beverage dispensing nozzle of FIG. 1 as taken along line 10-10 of FIG. 1.

A receptacle 140 of a beverage dispensing nozzle 100 is in fluid communication with diffuser assembly 150 and with flavoring inlets 124, as shown in FIG. 10. Diffuser assembly 150 is configured to provide a laminar flow of base liquid into receptacle 140 along inner wall 141 of receptacle 140. Flavoring flows through flavoring inlets 124 of nozzle head 120 directly into receptacle 140. Flavoring flows through an open central portion of receptacle 140 along a longitudinal axis X of nozzle 100. Receptacle 140 directs the flow of base liquid and flavoring to outlet 148 so that base liquid and flavoring are dispensed through outlet 148 of nozzle in a laminar flow pattern.

In order to maintain laminar flow through receptacle 140 and prevent splashing or turbulent flow within receptacle 140, peripheral openings 172 of second diffuser plate 170 may be arranged so as to direct the base liquid along inner wall 141 of receptacle 140. In some embodiments, an inner edge 173 of peripheral opening 172 is aligned with inner wall 141 of receptacle, as best shown in FIG. 10. In this way, flow of base liquid makes a smooth transition from diffuser assembly 150 to receptacle 140. Flow of base liquid may proceed along a line tangential to a curvature of inner wall 141 of receptacle 140. Flow of base liquid remains attached to inner wall 141 of receptacle 140. In some embodiments, however, inner edge 173 of peripheral opening 172 may be spaced inwardly from inner wall 141 and direct base liquid along inner wall 141. In such embodiments, inner edge 173 of peripheral opening 172 may be spaced from 0.1 mm to 5 mm from inner wall 141 at upper end 144 of receptacle 140.

As base liquid is configured to flow along inner wall 141 of receptacle 140 and flavoring flows through the open central portion of receptacle 140, a dry zone 149 may be created within receptacle 140, as shown in FIG. 10. Dry zone 149 may be a region surrounding outlets 134 of flavoring inlets 124 of nozzle head 120 within receptacle 140 in which no liquid is present at any time during operation of nozzle 100. If a base liquid contacts outlets 134 in receptacle 140, drops of flavoring remaining in flavoring inlet 124 may be drawn into receptacle 140, contaminating the beverage being dispensed with flavorings that may not have been selected to be dispensed. Thus, it is important to minimize or prevent splashing within receptacle 140 into dry zone 149.

Flavoring flows from flavoring outlet 134 on base 130 of nozzle head 120 through an interior of receptacle 140. Flavoring outlets 134 may be longitudinally aligned with outlet 148 of receptacle 140 so that the flavoring flows directly to outlet 148. Flavoring F intersects with base liquid B within receptacle 140 at intersection I located at outlet 148 or immediately adjacent to outlet 148, as shown for example in FIG. 10. The flow of flavoring interrupts the flow of the base liquid where the flavoring intersects the base liquid, which may result in splashing or turbulent flow. Thus, the flavoring intersects the base liquid at outlet 148 to minimize such effects within receptacle 140.

Figure 11:
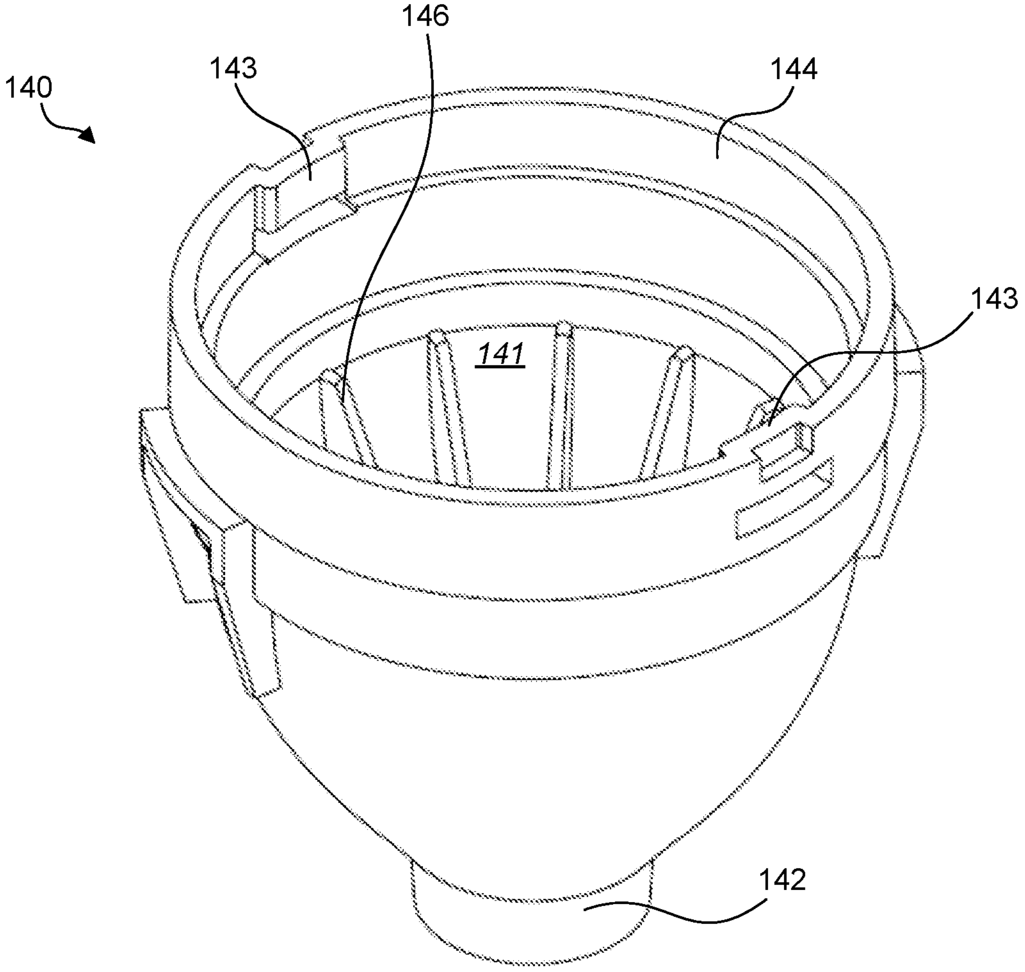
FIG. 11 shows perspective view of the receptacle of the beverage dispensing nozzle of FIG. 1.
Figure 12:
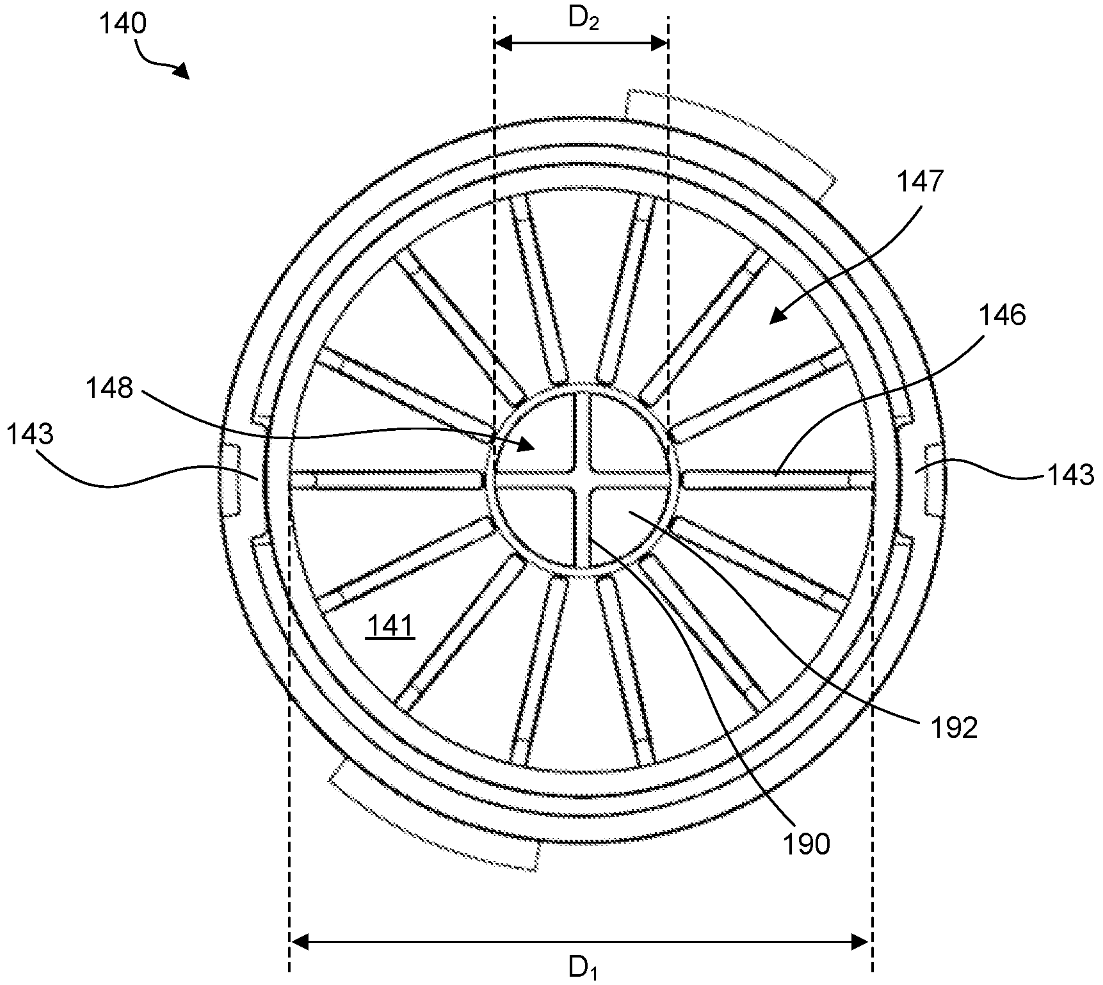
FIG. 12 shows a top-down view of a receptacle of FIG. 11.
Figure 13:
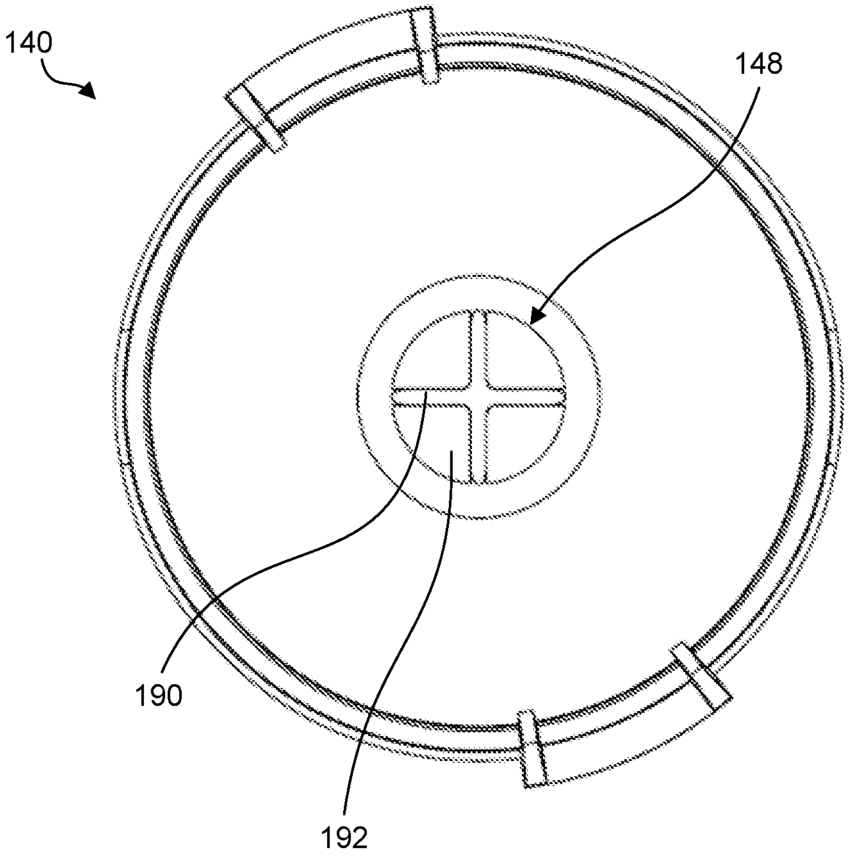
FIG. 13 shows a bottom view of the receptacle of FIG. 11.

Receptacle 140 of nozzle 100 is shown for example in FIGS. 11-13. Receptacle 140 directs base liquid and flavoring toward an outlet 148 of receptacle 140 to be dispensed from nozzle 100. Base liquid and flavoring intersect within receptacle 140 at intersection I and exit outlet 148 together. Receptacle 140 includes an open upper end 144 and a lower end 142 that is open at outlet 148. Outlet 148 may be arranged centrally on receptacle 140, as best shown in FIGS. 12 and 13. Receptacle 140 may taper from upper end 144 toward lower end 142, such that a diameter $D_1$ of upper end 144 is greater than a diameter $D_2$ of lower end 142 at outlet 148, as best shown in FIG. 12. In some embodiments, $D_2$ may be 0.200 inches to 0.800 inches, 0.300 inches to 0.700 inches, or 0.400 inches to 0.600 inches. In some embodiments, receptacle 140 may taper linearly so that receptacle 140 has a generally conical shape. However, in some embodiment, receptacle 140 may have a curvature, as shown in FIG. 11.

In some embodiments, receptacle 140 may further include vanes 146, as shown for example in FIG. 12. Vanes 146 may be disposed on an inner wall 141 of receptacle 140 and may extend generally perpendicularly from inner wall 141. Vanes 146 may be arranged radially around outlet 148 of receptacle 140 and may extend from lower end 142 toward upper end 144 of receptacle 140. Vanes 146 may be evenly spaced around outlet 148 and may be arranged at a fixed interval. Vanes 146 may be arranged symmetrically when viewed from the top-down, as shown in FIG. 12. In some embodiments, each vane 146 may have the same shape and dimensions. Vanes 146 define flow channels 147 for base liquid to flow within receptacle 140 toward outlet 148. Vanes 146 may help to prevent swirling of base liquid within receptacle 140, which may cause base liquid to exit through outlet 148 at an angle relative to a longitudinal axis X of nozzle 100. While diffuser assembly 150 is configured to evenly distribute base liquid around receptacle 140, there may be a somewhat greater flow of base liquid in one portion of receptacle 140, which may cause base liquid to swirl within receptacle 140 or cause streamlines of base liquid flowing along inner wall 141 to split or separate and rejoin chaotically in the absence of vanes 146, splitting of the streamlines may also result in splitting or deflection of the flow shape through outlet 148. Thus, vanes 146 help to control the direction of flow of base liquid within receptacle 140, direct the flow of base liquid toward outlet 148, and help form a uniform and laminar flow from outlet 148.

In some embodiments, receptacle 140 of nozzle 100 may have 4 to 20 vanes, 8 to 18 vanes, or 12 to 16 vanes. In some embodiments, receptacle 140 may include 14 vanes. The inventors of the present application found that the use of 14 vanes resulted in the most uniform and laminar flow from outlet 148 with an outlet diameter $D_2$ in a range of 0.500 inches to 0.600 inches and a flow rate of approximately 2.0 ounces per second and given the overall size of the nozzle as characterized by a diameter $D_1$ of approximately 1.900 inches. A different number of vanes may be appropriate depending on the dimensions of the nozzle assembly (e.g., $D_1$ and $D_2$), and the flow rate of the nozzle. In general, a nozzle having a relatively small outlet diameter $D_2$ and a relatively small overall size $D_1$ and a greater base liquid flow would require fewer vanes, and a nozzle having a relatively large outlet diameter $D_2$ and overall size $D_1$, and a lower base liquid flow rate would require a larger number of vanes.

In some embodiments, an outflow stabilizer 190 may be arranged within the outlet 148 of receptacle 140 in order to promote dispensing of beverage from nozzle 100 in a direction along a longitudinal axis X of nozzle 100, as best shown in FIG. 12. As base liquid flows along an inner wall 141 of receptacle 140, the flow of base liquid may cause base liquid to flow through outlet 148 at an angle relative to a longitudinal axis X of nozzle 100. While diffuser assembly 150 is configured to evenly distribute base liquid to receptacle 140, flow of base liquid may not be uniform through receptacle 140 at all times, and if the flow of base liquid is greater in one portion or side of receptacle 140, the flow of base liquid through outlet 148 may flow at a slight angle relative to a longitudinal axis of nozzle 100. Outflow stabilizer 190 may help to prevent the base liquid that flows along the inner walls 141 of receptacle 140 from colliding at outlet 148, which may otherwise divert the flow of the base liquid and flavoring through outlet 148. Outflow stabilizer 190 may have an X-shape or a cross-shape configuration and is arranged so as to divide outlet into multiple outflow regions 192. In some embodiments, outflow stabilizer 190 may have other shapes so as to divide outlet 148 into various numbers of outflow regions 192. The beverage flowing past outflow stabilizer 190 brings the beverage together into a uniform, aesthetically pleasing stream.

In some embodiments, nozzle 100 may be operated by a control system. In order to dispense a beverage from nozzle, control system may cause a selected base liquid, such as carbonated water, to flow through the nozzle, and control system may also cause a selected flavoring to flow through the nozzle. For example, control system may actuate one or more pumps for causing base liquid and flavoring to flow from a base liquid source or a flavoring source to the nozzle. As the base liquid and flavoring exit the outlet, the base liquid and flavoring may combine “in flight” as the base liquid and flavoring flow from the nozzle to a beverage container. The base liquid and flavoring may mix and combine further within the beverage container. In some embodiments, the base liquid may continue to be dispensed for a brief period of time after the flavoring stops being dispensed. For example, the period of time may be 100 ms to 400 ms, and in some embodiments may be 200 ms. In this way, any flavoring that may remain within the receptacle 140 of nozzle 100 can be washed out by the base liquid.

Figure 14:
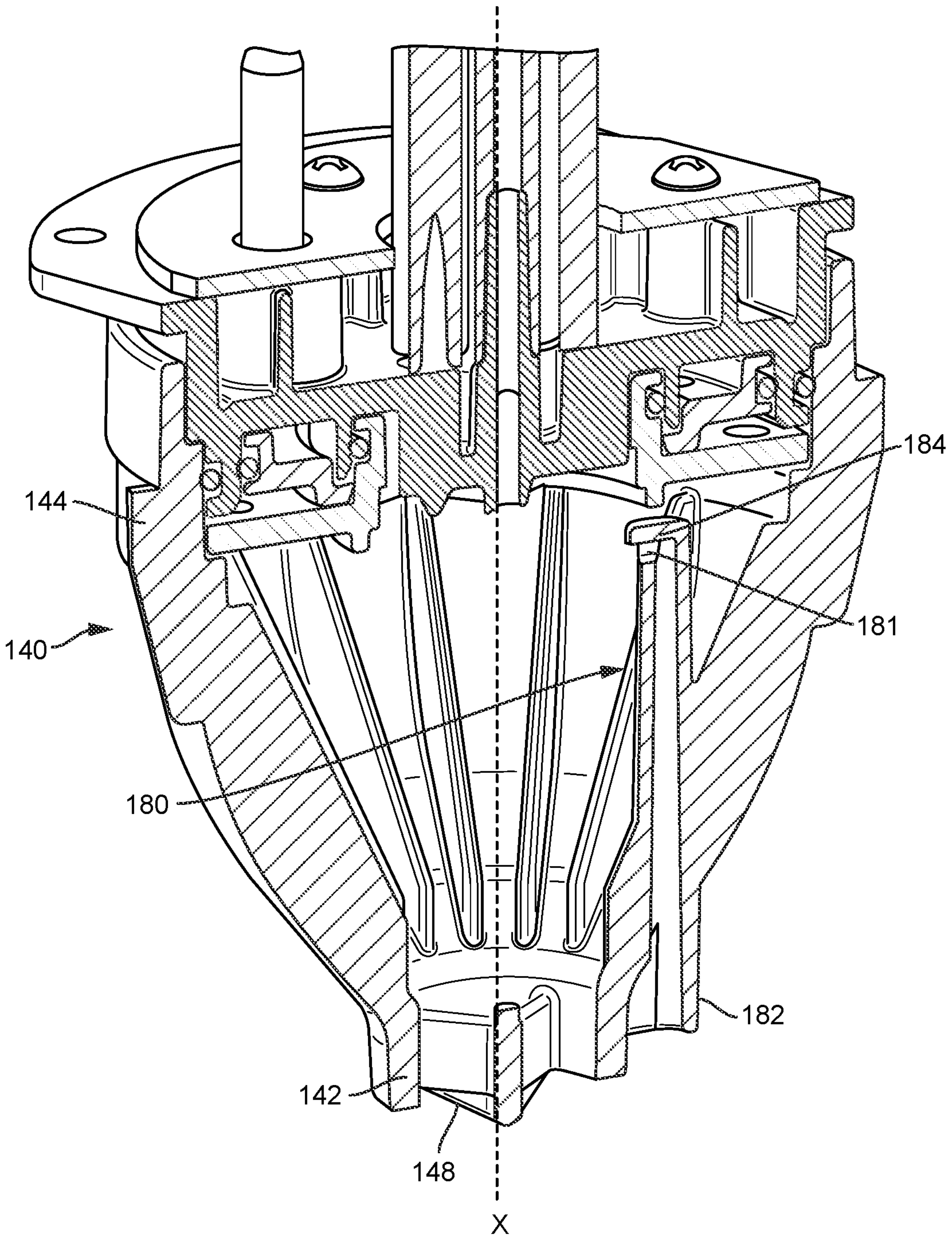
FIG. 14 shows a sectional view of a beverage dispensing nozzle having a vent tube.

In some embodiments, receptacle 140 may further include a vent for equalizing a pressure within nozzle 100 and external air pressure. In some embodiments, beverage dispensing nozzle 100 may include a vent tube 180, as shown for example in FIG. 14. Outlet 148 of beverage dispensing nozzle 100 may be sized so as to slightly restrict flow at outlet 148, which may help to provide a substantially cylindrical flow of base liquid through outlet 148 without ripples. However, as a result of the flow restriction, base liquid may back up at outlet 148 and may become trapped in receptacle 140 at the end of the dispensing operation. The backup of base liquid may result in carryover of flavor. Vent tube 180 serves to equalize the internal air pressure within the nozzle and external air pressure, allowing the base liquid to fully drain and preventing base liquid from becoming trapped within receptacle 140 at the end of the dispensing operation. Vent tube 180 may also help to promote a smooth flow of liquid through outlet 148.

Vent tube 180 may include a hollow tubular member configured to place an interior of receptacle 140 in fluid communication with an area external to beverage dispensing nozzle 100. Vent tube 180 may be arranged parallel to a longitudinal axis X of nozzle 100 (and of receptacle 140). Vent tube 180 may also be offset from a center of receptacle 140 so that flavoring flowing through a central portion of nozzle 100 does not contact vent tube 180. Vent tube 180 includes an upper end 184 arranged within receptacle 140 and a lower end 182 outside of receptacle 140 and adjacent outlet 148 of receptacle 140 so that lower end 182 is open to the environment. Vent tube 180 may include an opening 181 at upper end 184 and may include an open lower end 182. In this way, air may flow from an exterior of receptacle 140 to an interior of receptacle 140 (and of nozzle 100), or air may flow in the reverse direction from the interior to the exterior so as to equalize interior and exterior pressures. Opening 181 at upper end 184 may be arranged on a sidewall of vent tube 180 and thus may extend in a direction transverse to longitudinal axis X to prevent liquid from escaping nozzle 100 through vent tube 180.

Figure 15:
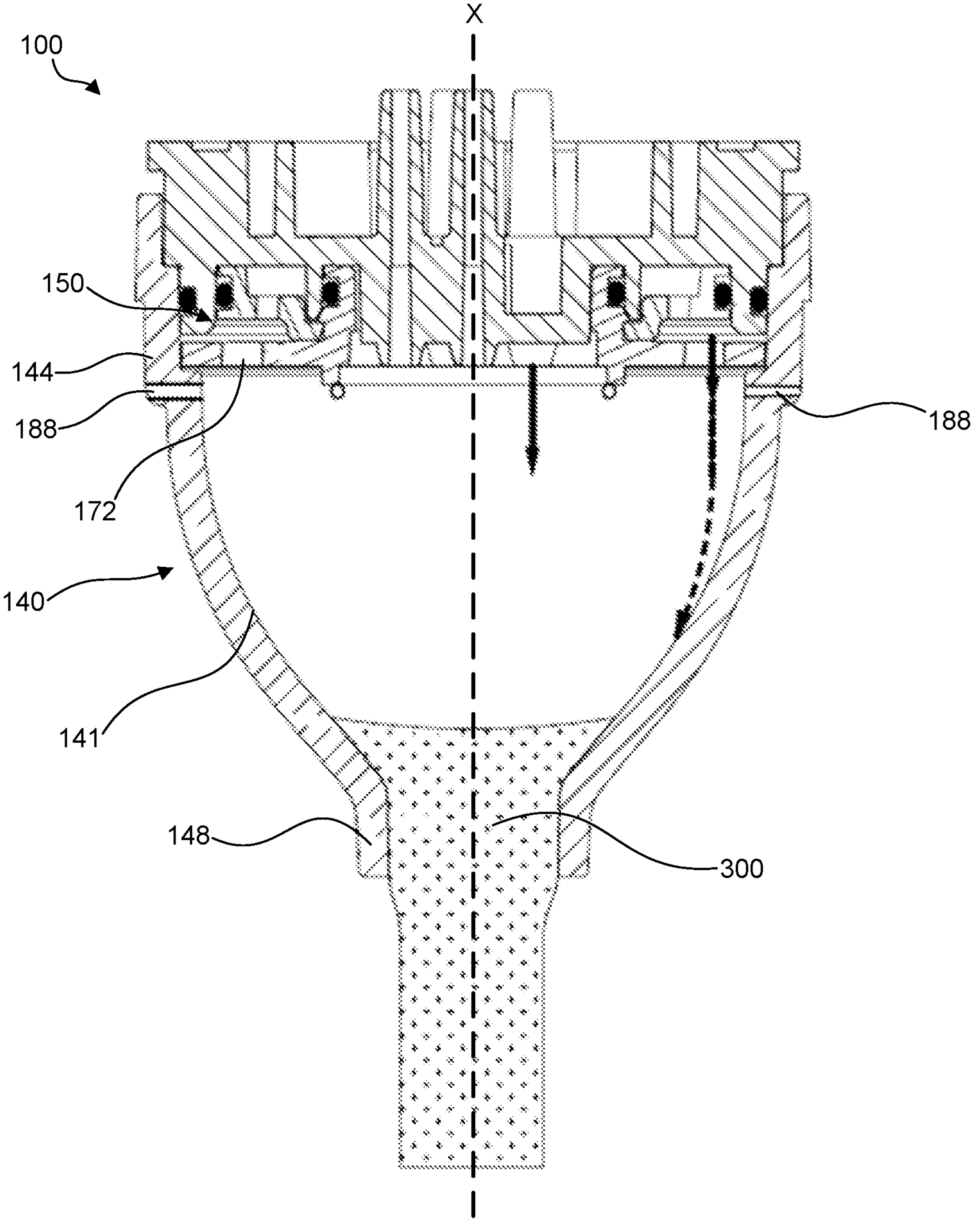
FIG. 15 shows a cross sectional view of a beverage dispensing nozzle having vent holes.

In some embodiments, receptacle 140 may alternatively or additionally include vent holes 188, as shown in FIG. 15. Vent holes 188 may function similarly to vent tube 180 of FIG. 14, and may serve to equalize the internal air pressure within the nozzle and external air pressure. In this way, vent holes 188 may help to allow base liquid 300 to fully drain, preventing base liquid 300 from becoming trapped within receptacle 140 at the end of the dispensing operation. In some embodiments, or more vent holes 188 may be formed around a periphery of receptacle 140. Vent holes 188 may be laterally oriented, and thus may be oriented perpendicular to a longitudinal axis X of nozzle 100. Vent holes 188 may be located at upper end 144 of receptacle 140 and may be positioned such that the holes are not in a direct flow path of the base liquid flow from diffuser assembly 150 onto inner wall 141 of receptacle 140.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. A nozzle, comprising:

a nozzle head, comprising:

a flavoring inlet for receiving a flavoring; and a base liquid inlet for receiving a base liquid;

a flavoring outlet;

a diffuser assembly comprising at least one diffuser plate having an annular region defining a plurality of peripheral openings through which the base liquid flows; and a receptacle, wherein the flavoring outlet is configured to release the flavoring into the receptacle, the receptacle comprising:

an inner wall having a curvature;

a receptacle outlet for dispensing the base liquid and the flavoring from the nozzle;

an upper end, wherein the flavoring outlet is arranged at the upper end of the receptacle;

a lower end, wherein the receptacle outlet is disposed at the lower end of the receptacle; and a vent tube configured to equalize a pressure within the receptacle with a pressure external to the nozzle, wherein the vent tube extends through a receptacle wall at a location between the upper end of the receptacle and the lower end of the receptacle, wherein the flavoring inlet is in fluid communication with the receptacle such that the flavoring flows through the receptacle toward the receptacle outlet in a longitudinal direction of the nozzle, and wherein the diffuser assembly is in fluid communication with the receptacle such that the base liquid flows along the inner wall of the receptacle.

2. The nozzle of claim 1, further comprising a plurality of vanes radially arranged on the inner wall of the receptacle.

3. The nozzle of claim 2, wherein the vent tube is radially aligned relative to a longitudinal axis of the receptacle with one of the vanes of the plurality of vanes.

4. The nozzle of claim 1, wherein the vent tube comprises an upper end of the vent tube and a lower end of the vent tube, and wherein the upper end is arranged within the receptacle and comprises an opening on a sidewall of the vent tube, and wherein the lower end of the vent tube is arranged outside of the receptacle and comprises an opening.

5. The nozzle of claim 4, wherein the upper end of the vent tube is closed.

6. The nozzle of claim 1, wherein the vent tube is arranged parallel to a longitudinal axis of the nozzle.

7. The nozzle of claim 6, wherein the longitudinal axis extends through the receptacle outlet and the vent tube is arranged along an axis that is parallel to and offset from the longitudinal axis.

8. The nozzle of claim 1, wherein the diffuser assembly is arranged at the upper end of the receptacle, and wherein the receptacle tapers from a first diameter at the upper end of the receptacle to a second diameter at the lower end of the receptacle, the first diameter being greater than the second diameter.

9. The nozzle of claim 1, wherein the vent tube comprises an opening located between the upper end of the receptacle and the lower end of the receptacle.

10. The nozzle of claim 1, wherein the nozzle head and the diffuser assembly are arranged at the upper end of the receptacle.

11. The nozzle of claim 1, wherein the vent tube projects into the receptacle from the inner wall of the receptacle toward an upper end of the vent tube.

12. The nozzle of claim 1, wherein the receptacle further comprises an outer wall, and the vent tube projects away from the receptacle from the outer wall of the receptacle toward a lower end of the vent tube.

* * * * *